US012443380B2

(12) United States Patent
Gehler et al.

(10) Patent No.: US 12,443,380 B2
(45) Date of Patent: Oct. 14, 2025

(54) APPARATUS, SYSTEMS, AND METHODS FOR DISPLAY CONTENT CONTROL AT ELECTRONIC USER DEVICES

(71) Applicant: Intel Corporation, Santa Clara, CA (US)

(72) Inventors: Rivka Gehler, Jerusalem (IL); Isaac Hazan, Jerusalem (IL); Dor Levy, Rehovot (IL)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/555,014

(22) Filed: Dec. 17, 2021

(65) Prior Publication Data
US 2022/0107774 A1   Apr. 7, 2022

(51) Int. Cl.
*G06F 3/14*   (2006.01)
*G06F 21/32*   (2013.01)
*G06F 21/60*   (2013.01)
*H04N 1/44*   (2006.01)

(52) U.S. Cl.
CPC ............ *G06F 3/1423* (2013.01); *G06F 21/32* (2013.01); *G06F 21/604* (2013.01); *H04N 1/448* (2013.01)

(58) Field of Classification Search
CPC .... G06F 21/32; G06F 21/604; G06F 21/6245; G06F 3/1423; G09G 2358/00; H04N 1/448
See application file for complete search history.

(56) References Cited

U.S. PATENT DOCUMENTS

| | | | |
|---|---|---|---|
| 10,067,565 B2 | 9/2018 | Ramaprakash et al. | |
| 11,205,008 B2 | 12/2021 | Sengupta et al. | |
| 12,218,795 B2* | 2/2025 | Smith | G06F 16/1824 |
| 2006/0115130 A1* | 6/2006 | Kozlay | G06F 21/32 340/5.74 |
| 2020/0082125 A1* | 3/2020 | VanBlon | G06F 21/6245 |
| 2022/0107774 A1* | 4/2022 | Gehler | G06F 21/32 |
| 2024/0061673 A1* | 2/2024 | Ben Zakai | G06F 21/6281 |

(Continued)

OTHER PUBLICATIONS

Liam Tung, "No PC monitor? Samsung smart sunglasses double as smartphone and desktop display," ZDNET, dated Feb. 21, 2017, retrieved from https://www.zdnet.com/article/no-pc-monitor-samsung-smart-sunglasses-double-assmartphone-and-desktop-display/ on Jun. 22, 2023, 8 pages.

(Continued)

*Primary Examiner* — Dmitriy Bolotin
(74) *Attorney, Agent, or Firm* — Hanley, Flight & Zimmerman, LLC

(57) ABSTRACT

Apparatus, systems, and methods for display content control at electronic user devices are disclosed. Example apparatus disclosed herein are to detect a sensitive information identifier associated with content, the sensitive information identifier to indicate the content includes sensitive information. Disclosed example apparatus are also to filter the content to change a viewing property of the sensitive information. Disclosed example apparatus are further to cause a first display screen associated with a first device to present the filtered content, and cause a second display screen associated with a second device to present the sensitive information during presentation of the filtered content by the first display screen associated with the first device.

20 Claims, 9 Drawing Sheets

(56) References Cited

U.S. PATENT DOCUMENTS

2025/0028198 A1* 1/2025 Lee .................. G02F 1/1323
2025/0047836 A1* 2/2025 Francis ............. H04N 19/13

OTHER PUBLICATIONS

Microsoft 365, "Restrict access to content by using sensitivity labels to apply encryption," Microsoft Purview, Microsoft Learn, dated Mar. 25, 2021, https://docs.microsoft.com/en-US/microsoft-365/compliance/encryption-sensitivity-labels?view=o365-worldwide, retrieved from https://web.archive.org/web/20210422234747/https://docs.microsoft.com/en-us/Microsoft-365/compliance/encryption-sensitivity-labels?view=o365-worldwide on Jun. 22, 2023, 25 pages.
Jon Fingas, "Samsung Gear VR app provides help to the visually impaired," Engadget, dated Aug. 20, 2017, retrieved from https://www.engadget.com/2017-08-20-samsung-relumino-vision-ar-app.html on Jun. 22, 2023, 3 pages.
HP, "HP Sure View," dated Nov. 2016, retrieved from http://www.hp.com/ctg/Manual/c05317278#:~:text=HP%20Sure%20View%20eliminates%20the,view%20information%20on%20the%20screen on Jun. 22, 2023, 5 pages.
Bohn, Dieter, "Intel made smart glasses that look normal," The Verge, dated Feb. 5, 2018, retrieved from https://www.theverge.com/2018/2/5/16966530/intel-vaunt-smart-glasses-announced-ar-video on Jun. 22, 2023, 25 pages.
"Epson Moverio BT-300," retrieved from https://www.aniwaa.com/product/vr-ar/epson-moverio-bt-300/ on Jun. 22, 2023, 4 pages.
"Google Glass Enterprise Edition," retrieved from https://www.aniwaa.com/product/vr-ar/google-glass-enterprise-edition/ on Jun. 22, 2023, 4 pages.
Samsung, "Gear VR," https://www.samsung.com/global/galaxy/gear-vr/, retrieved from https://web.archive.org/web/20210608010304/https://www.samsung.com/global/galaxy/gear-vr/ on Jun. 22, 2023 (captured Jun. 8, 2021), 21 pages.

* cited by examiner

APPARATUS, SYSTEMS, AND METHODS FOR DISPLAY CONTENT CONTROL AT ELECTRONIC USER DEVICES

FIELD OF THE DISCLOSURE

This disclosure relates generally to electronic user devices and, more particularly, to apparatus, systems, and methods for display content control at electronic user devices.

BACKGROUND

An electronic user device such as a laptop includes a display screen to present content such as images, text, etc. In some instances, the content presented for display can include confidential information. In some instances, the content can include data that a user may wish to censor, for instance, for parental control.

BRIEF DESCRIPTION OF THE DRAWINGS

In general, the same reference numbers will be used throughout the drawing(s) and accompanying written description to refer to the same or like parts. The figures are not to scale.

Figure 1:
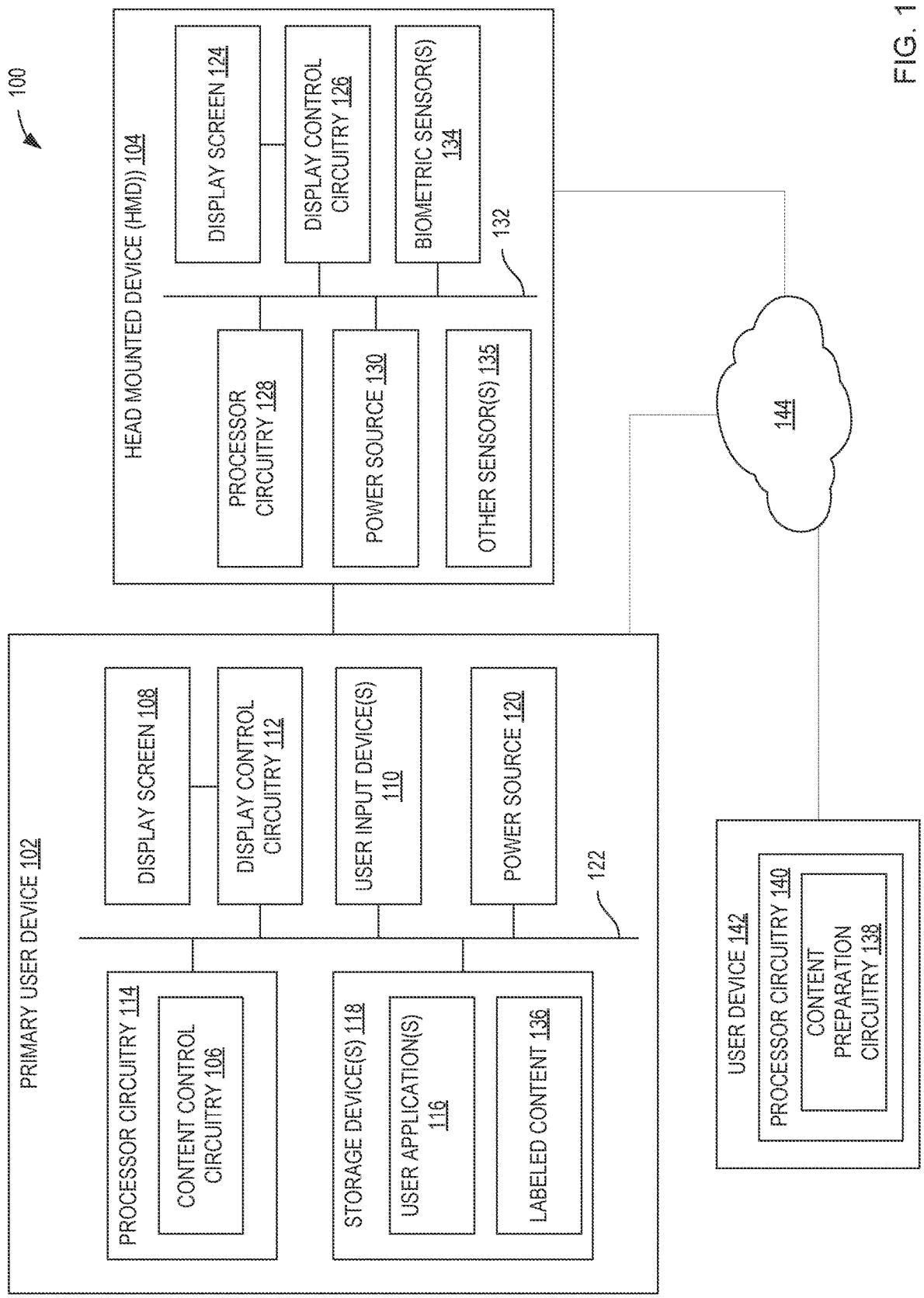
FIG. 1 illustrates an example system constructed in accordance with teachings of this disclosure and including a primary user device, a secondary, head-mounted device, and content control circuitry for controlling display of content at the primary user device and the head-mounted device in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device such as a laptop includes a display screen to present content such as images, text, etc. In some instances, the content presented for display can include confidential information Thus, if a user is using the laptop in a public space such as a coffee shop, the confidential information may be viewed by other individuals in the public space in addition to the intended viewer (e.g., the user of the laptop). In some instances, a group of colleagues may be working together in a physical or virtual collaboration space, but the colleagues may have various levels of security clearance with respect to assessing information. In such instances, some individuals may not be authorized to view certain types of data.

In some instances, the electronic user device can present media files such as a movie. A user may wish to censor one or more scenes in the movie for purposes for parental control and/or to prevent display of sensitive content (e.g., content of a violent or sexual nature) when, for instance, watching the movie in a public space such as on an airplane.

A privacy filter (e.g., a plastic screen filter) can be coupled to (e.g., placed over) a display screen of an electronic user device. The privacy filter restricts a viewing angle of the display to, for instance, 60 degrees. As such, a user of the device can see content displayed via the device when directly looking the display, but visibility of the content is substantially reduced and/or blocked when an individual is outside of the viewing angle. However, if an unauthorized or unintended person is located within the viewing area of the display (e.g., standing directly behind the authorized user), then the privacy provided by the filter is compromised.

Some prior electronic user devices can operate in a privacy mode to control light emitted by a backlight the device and, thus, affect content viewable via a display screen of the device. When the privacy mode is disabled, light from the backlight is dispersed across the display of the device and content is visible across the display. When the privacy mode is activated, the light is directed toward a center of the display. As a result, when the privacy mode is activated and the display is viewed at an angle, the amount of light dispersed across the display is reduced, which hinders viewing of information on the screen. However, as with the privacy filter, if an unauthorized or unintended individual is located within the angle of the projected light (e.g., standing directly behind the authorized user), the privacy mode is compromised.

Disclosed herein are example systems, apparatus, and methods that provide for dynamic detection of sensitive information in content, such as a word processing document, a media file such as a video, etc., and selective display of the content based on the detection of the sensitive information. Examples disclosed herein detect identifiers (e.g., metadata tags, highlighted or flagged portions of a document, etc.) indicating the presence of sensitive information, such as confidential data, images to be censored due to a nature of the content (e.g., violent content), etc. In response to the detection of the sensitive information indicators, examples disclosed herein adjust a viewing property of the sensitive information to protect the sensitive information from being viewed by observers other than the intended viewer. Some examples disclosed herein apply a filter to the content to redact or otherwise remove the sensitive information from being displayed. Some examples disclosed herein instruct display control circuitry of the primary user device to adjust a display mode of the display screen to prevent content from being viewable via the display screen by causing the display screen to appear, for instance, as a black screen. Thus, examples disclosed prevent the display of sensitive information via a user device such as a laptop that could otherwise result in the sensitive information being inadvertently viewed.

In addition to preventing display of sensitive information via a primary user device such as a laptop or desktop monitor, example disclosed herein provide for secure presentation of the sensitive information via a secondary user device that provides for more private viewing than the primary user device. The secondary user device can include, for instance, a head-mounted device. Examples disclosed herein authenticate a user of the secondary user device based on, for instance, biometric data (e.g., iris scan data) to confirm that the user is authorized to view the sensitive information. When the user is authenticated, examples disclosed herein provide for presentation of the sensitive information via the secondary user device while simultaneously causing the filtered version of the content to be displayed via the primary user device. In some examples, the secondary user device is an augmented reality device and the sensitive information is presented as augmented reality content. In such examples, the sensitive information viewed via the secondary user device can appear to overlay or be aligned with corresponding redacted portion(s) of the filtered content presented via the primary user device. In other examples, the content including the sensitive information can be presented as, for instance, virtual reality content. Thus, examples disclosed herein provide for selective viewing of sensitive information that can be used to, for instance, protect the integrity of confidential data in view of security clearance levels between colleagues or facilitate parental control over media by enabling content to be filtered via a device viewed by a child.

FIG. 1 illustrates an example system 100 constructed in accordance with teachings of this disclosure for providing display content control at electronic user devices. The example system 100 includes an example primary user device 102 and an example secondary user device 104 that provides for more private viewing than the primary user device. In the example of FIG. 1, the secondary user device is a head-mounted device (HMD). The example system 100 of FIG. 1 includes example content control circuitry 106 (which is included in the primary user device 102 in the illustrated example) to selectively cause content (e.g., document(s), image(s), video file(s)) to be presented via the primary user device 102 and the HMD 104 based on detection of identifier(s) indicating that the content includes sensitive information (e.g., confidential information, content to be censored, etc.).

The primary user device 102 of FIG. 1 can be a personal computing device such as a laptop, a desktop computer, an electronic tablet, a smartphone, etc. The example primary user device 102 includes an example display screen 108 to present the content to a user of the primary user device 102. In some examples, the display screen 108 is a touch screen that enables the user to interact with data presented on the display screen 108 by touching the display screen 108 with a stylus and/or one or more fingers or a hand of the user. Additionally or alternatively, the user can interact with data presented on the display screen 108 via user input device(s) 110 such as a keyboard, a mouse, a touch pad, microphone(s), etc.

The primary user device 102 of FIG. 1 includes example display control circuitry 112 (e.g., a graphics processing unit (GPU)) to control operation of the display screen 108 and facilitate rending of content (e.g., display frame(s) associated with graphical user interface(s)) via the display screen 108. In some examples, the display control circuitry 112 is implemented by example processor circuitry 114 of the primary user device 102.

The processor circuitry 114 of the illustrated example is a semiconductor-based hardware logic device. The hardware processor circuitry 114 may implement a central processing unit (CPU) of the primary user device 102, may include any number of cores, and may be implemented, for example, by a processing commercially available from Intel® Corporation. The processor circuitry 114 executes machine readable instructions (e.g., software) including, for example, example user application(s) 116 installed on the primary user device 102. The user application(s) 116 are stored in one or more example storage devices 118 such as non-volatile memory (e.g., flash memory). The example primary user device 102 of FIG. 1 includes an example power source 120 such as a battery and/or transformer and AC/DC converter to provide power to the processor circuitry 114 and/or other components of the primary user device 102 communicatively coupled via an example bus 122.

Although shown as one device 102, any or all of the components of the primary user device 102 may be in separate housings and, thus, the primary user device 102 may be implemented as a collection of two or more user devices. In other words, the primary user device 102 may include more than one physical housing. For example, the logic circuitry (e.g., processor circuitry 114) along with support devices such as the one or more storage devices 118, the power supply 120, etc., may be a first user device contained in a first housing of, for example, a desktop computer, and the display screen 108 may be contained in a second housing separate from the first housing. The second housing may be, for example, a display housing. Thus, although FIG. 1 and the accompanying description refer to the components as components of the primary user device 102, these components can be arranged in any number of manners with any number of housings of any number of user devices.

The example system 100 includes the secondary user device 104, also referred to herein as the HMD 104. In the example of FIG. 1, the HMD 104 is communicatively coupled to the primary user device 102 via one or more wired or wireless communication protocols (e.g., WiFi, Bluetooth®). When worn by a user, the HMD 104 provides for more private viewing of content than the primary user device 102. In particular, the HMD 104 provides for a more restricted viewing area than the primary user device 102 because an example display screen 124 of the HMD 104 can be viewed only the wearer, whereas the display screen 108 of the primary user device 102 may be viewable by anyone positioned in front of the display screen 108.

The example HMD 104 of FIG. 1 includes an example display screen 124 to present content to a user of the HMD 104. In the example of FIG. 1, the HMD 104 can facilitate presentation of extended reality content, such as augmented reality, virtual reality, and/or mixed reality content. The HMD 104 of FIG. 1 includes example display control circuitry 126 to control operation of the display screen 124 and facilitate rending of content via the display screen 124. In some examples, the display control circuitry 126 is implemented by example processor circuitry 128 (e.g., semi-conductor-based hardware logic device(s)) of the HMD 104. The example HMD 104 of FIG. 1 includes an example power source 130 such as a battery and/or transformer and AC/DC converter to provide power to the processor circuitry 128 and/or other components of the HMD 104 communicatively coupled via an example bus 132.

The example HMD 104 of FIG. 1 includes one or more example biometric sensors 134. The biometric sensor(s) 134 can include, for instance, an iris scanner. The biometric sensor(s) 134 collects biometric data from the user of the HMD 104 (e.g., iris scan information). As disclosed herein, the biometric data collected by the biometric sensor(s) 134 of the HMD 104 is used to verify that the user of the HMD 104 is permitted to view sensitive content (e.g., confidential information).

The example HMD 104 of FIG. 1 can include one or more other types of example sensors 135 including, for example, motion and/or proximity sensors, accelerometers, eye tracking sensors, etc. The sensor(s) 135 can output signals that are used to, for instance, detect an operational state of the HMD 104, to interpret user gestures, to detect when the user is wearing the HMD 104, etc.

As disclosed herein, the primary user device 102 and the HMD 104 selectively present content to a user based on detection of identifier(s) indicating that the content includes sensitive information (e.g., content that is confidential, private, or otherwise identified as content to be censored, protected, redacted, etc.). In the example of FIG. 1, the storage device(s) 118 of the primary user device 102 store example labeled content 136 that is to be presented via the display screen 108 of the primary user device 102. The labeled content 136 can include, for example, graphical content such as image files, word processing documents, etc. The labeled content 136 can be associated with the user application(s) 116 (e.g., a video file to be played via a media player application).

In the example of FIG. 1, one or more portions of the labeled content 136 is marked, flagged, tagged, or otherwise labeled with identifier(s) indicating that the one or more portions of the content 136 includes sensitive information. For instance, the labeled content 136 can include a word processing document that includes portions of the text in the document highlighted as confidential. In some examples, the content includes, for instance, a video file and one or more frames of the video file are labeled with an indicator that the frame(s) should be censored (e.g., due to a violent scene in the frame(s)).

In the example of FIG. 1, the labeled content 136 is labeled by a user (e.g., the user of the primary user device 102 or a different user) via example content preparation circuitry 138. In the example of FIG. 1, the content preparation circuitry 138 is shown as implemented by example processor circuitry 140 (e.g., semiconductor-based hardware logic device(s)) of another example user device 142 different than the primary user device 102 and the HMD 104. However, in other examples, the content preparation circuitry can be implemented by, for example, the processor circuitry 114 of the primary user device 102, an example cloud-based device 144 (e.g., one or more server(s), processor(s), and/or virtual machine(s)), etc.

The content preparation circuitry 138 enables a second user (e.g., a different user than the user of the primary user device 102) to mark or add identifier(s) to one or more portions of the content 136 to indicate that that the content 136 includes sensitive information. For example, the content preparation circuitry 138 can enable the second user to highlight text in a document that is confidential, thereby assigning a confidential label to the text. As another example, the content preparation circuitry 138 can enable the second user to tag an image or a frame of a video file to indicate the image or frame should be censored. In some examples, the tag(s), label(s), flag(s), or identifier(s) are included in metadata associated with the labeled content 136. In other examples, the tag(s), label(s), flag(s), or identifier(s) are added directly to or incorporated in the content, such as a document that includes highlighting to identify the sensitive information.

In the example of FIG. 1, the content preparation circuitry 138 enables the second user to assign permissions to the labeled content 136 to identify user(s) (e.g., including the second user and/or other users) who are authorized to view the sensitive information. For example, when applying or adding a tag to a portion of the content 136 to identify sensitive information in that portion, the second user can include the names of the user(s) who are permitted to view the sensitive information.

The labeled content 136 including the sensitive information identifier(s) and associated permissions can be transmitted to the primary user device 102 via wired or wireless communication protocols. For instance, the labeled content 136 can be uploaded from the user device 142 to the cloud 144 and downloaded to the storage device(s) 118 of the primary user device 102.

In the example of FIG. 1, the content control circuitry 106 analyzes the labeled content 136 to determine whether the labeled content 136 includes identifier(s) (e.g., metadata tag(s)) indicating that one or more portions of the labeled content 136 includes sensitive information (i.e., confidential information, data to be censored, redacted, etc.). If the content control circuitry 106 does not detect identifier(s) in a portion of the labeled content 136, the content control circuitry 106 causes that portion of the labeled content 136 to be presented via the display screen 108 of the primary user device 102 without any modification to the labeled content 136. If the content control circuitry 106 determines that a portion of the labeled content 136 includes identifier(s) indicating that the content includes sensitive information, then the content control circuitry 106 generates a filtered version of the labeled content 136, or version in which viewing properties of the sensitive information are adjusted (e.g., the sensitive information is hidden, redacted, blurred, removed, etc. from the portion of the content). In such examples, the content control circuitry 106 causes the filtered version of the labeled content 136 to be presented via the display screen 108 of the primary user device 102. Also, in some examples, the content control circuitry 106 causes an unfiltered version of the labeled content 136—i.e., a version of the labeled content 136 including the sensitive information—to be presented via the HMD 104. Because the HMD 104 provides for private viewing as compared to the primary user device 102 (e.g., a laptop), the integrity of the sensitive information is protected from, for instance, public view.

In the example of FIG. 1, content control circuitry 106 is implemented by executable instructions executed on the processor circuitry 114 of the user device 102. However, in some examples, the content control circuitry 106 is implemented by the processor circuitry 128 of the HMD 104 in communication with the primary user device 102 (e.g., via wired or wireless communication protocols), processor circuitry of another user device (e.g., the user device 142, a smartphone, another wearable device), and/or by the cloud-based device 144 (e.g., one or more server(s), processor(s), and/or virtual machine(s)). In some examples, the content control circuitry 106 is implemented by dedicated circuitry located on the primary user device 102 and/or the HMD 104. These components may be implemented in software, hardware, or in any combination of two or more of software, firmware, and/or hardware.

The content control circuitry 106 analyzes the labeled content 136 to detect tag(s), flag(s), label(s), or other identifier(s) of sensitive information associated with one or more portions of the labeled content 136 (e.g., assigned to the portion(s) of the labeled content 136 via the content preparation circuitry 138). For instance, the content control circuitry 106 can analyze metadata of each frame of a video file to determine if the metadata includes tag(s) identifying the frame(s) as including sensitive information. As another example, the content control circuitry 106 can analyze (e.g., scan) a word processing document to determine if any portion of the document has been tagged or marked as sensitive. The content control circuitry 106 can recognize the identifier(s) indicating that the labeled content 136 includes sensitive information based on rules that define identifiers associated with the content preparation circuitry 138.

In response to determining that one or more portions of the labeled content 136 includes sensitive information identifier(s), the content control circuitry 106 filters the portion(s) of the labeled content 136 associated with the label(s) to generate filtered labeled content. For example, the content control circuitry 106 causes one or more viewing properties of the sensitive information to be adjusted in the filtered labeled content to prevent the sensitive information from being viewed. In some examples, the content control circuitry 106 causes portion(s) of the labeled content 136 marked as sensitive to be hidden (e.g., blacked out, blurred, scrambled redacted). For example, the content control circuitry 106 can generate a black box to hide a portion of a document flagged with a confidential identifier. In the example of FIG. 1, the content control circuitry 106 causes the filtered document including the black box to be presented via the display screen 108 of the primary user device 102.

In some examples, to adjust the viewing properties of the sensitive information, the content control circuitry 106 instructs the display controller circuitry 112 to prevent the labeled content 136 and other content (e.g., other user application windows) from being viewable via the display screen 108. For instance, the display controller circuitry 112 can turn off a light for the display screen 108, which can make the display screen 108 appear as a black screen such that neither the portion of the labeled content 136 including the sensitive information nor other content is viewable via the display screen 108. Thus, the content control circuitry 106 prevents sensitive content (e.g., confidential data, content a user wishes to censor such as content of violent or sexual nature, etc.) from being displayed via the primary user device 102. As a result, individuals in the environment in which the primary user device 102 is located are prevented from intentionally or unintentionally viewing the sensitive content.

In the example of FIG. 1, the content control circuitry 106 causes the labeled content 136 including the sensitive information (i.e., an unfiltered version of the labeled content) to be displayed via the HMD 104 for viewing by an authorized user. In the example of FIG. 1, the content control circuitry 106 authenticates the user of the HMD 104 to confirm that the user of the HMD 104 is authorized to view the sensitive information associated with the labeled content 136. As disclosed herein, the labeled content 136 can include user permission information that identifies the user(s) who are permitted to view the sensitive content. In some instances, reference or baseline biometric data can be collected from the authorized user(s) as part of, for instance, a calibration process performed at the HMD 104 using the biometric sensor(s) 134 and/or at another device including a biometric scanner (e.g., the primary user device 102).

The user of the HMD 104 can be authenticated using reference biometric data and collected biometric data obtained from the user via the biometric sensor(s) 134 of the HMD 104 and/or biometric sensor(s) of other devices (e.g., the primary user device 102). In some examples, the biometric data is collected or otherwise obtained from the user and/or biometric authentication when, for instance, the user attempts to access the labeled content 136 via the primary user device 102. In some examples, the biometric data collection and/or the biometric authentication is performed in response to the detection of the sensitive information in the labeled content 136 and prior to display of the sensitive information via the HMD 104. To perform the biometric authentication, the content control circuitry 106 compares the biometric data collected via the biometric sensor(s) 134 of the HMD 104 to the reference biometric data for the authorized user(s) to determine if the user of the HMD 104 is an authorized user based on, for instance, a match between the biometric data of the user and the reference biometric data.

Additionally or alternatively, in some examples, the content control circuitry 106 authenticates the user as an authorized viewer of the sensitive information in the labeled content 136 via the primary user device 102. For instance, the content control circuitry 106 can authenticate the user based on entry of protected identification information such as a password or personal identification number (PIN) at the primary user device 102. The level of authentication security can be defined by user inputs. For instance, the authentication levels can include authentication based on biometric data collected via the HMD 104, authentication based on protected identification information (e.g., passwords) provided at primary user device 102, or a combination of biometric authentication via the HMD 104 and authentication via the primary user device 102.

In the example of FIG. 1, when the content control circuitry 106 verifies that the user of the HMD 104 is an authorized viewer of the sensitive information, the content control circuitry 106 causes the unfiltered version of the labeled content 136 to be presented via the display screen 124 of the HMD 104 while simultaneously causing the filtered (e.g., redacted) version of the labeled content 136 to be displayed via the primary user device 102. The unfiltered version of the labeled content 136 can be an unmodified version of the content, such as an image without any portions of the image being blurred, or a document without any black-box redactions.

As disclosed herein, the HMD 104 can facilitate presentation of augmented reality (AR) content, virtual reality (VR) content, or mixed reality content. In some examples, the unfiltered version of the labeled content 136 can be presented in an AR, VR, or mixed reality format. For instance, when the HMD 104 is an AR device, the unfiltered portions of a word processing document can be presented as AR content via the HMD 104 such that the unfiltered portions of the document appear to overlay the corresponding redacted portions of the document displayed via the primary user device 102. The user can interact with the unfiltered version of document while wearing the HMD 104 using, for example, gestures to add mark-ups to the text, the move to another page in the document, etc. In some examples, the HMD 104 is not an AR, VR, or mixed reality device. In such examples, the unfiltered version of the labeled content 136 can be presented via the display screen 124 of the HMD 104 for viewing but the user may not otherwise interact with the content.

When the content control circuitry 106 determines that another portion (e.g., a subsequent or different portion) of the labeled content 136 does not include identifier(s) indicating sensitive information, the content control circuitry 106 can cause presentation of the labeled content 136 via the HMD 104 to end. In such instances, the content control circuitry 106 causes the labeled content 136 without filtering to be presented via the primary user device 102 until the content control circuitry 106 detects that another portion of the labeled content 136 includes indicator(s) of sensitive information. In response to detecting that another portion of the labeled content 136 includes the flagged sensitive content, the content control circuitry 106 filters the content displayed at the primary user device 102 and causes the unfiltered content to be displayed via the HMD 104.

In other examples, when the content control circuitry 106 determines that another portion (e.g., a subsequent or different portion) of the labeled content 136 does not include identifier(s) indicating sensitive information, the content control circuitry 106 can cause unfiltered labeled content 136 to be displayed on the HMD 104 in addition to the primary user device 102. Thus, in some examples, the user does not need to take off the HMD 104 to continue viewing the content 136.

If the content control circuitry 106 is unable to authenticate the user of the HMD 104, the content control circuitry 106 prevents the labeled content 136 including the sensitive information from being displayed via the HMD 104. In such instances, the content control circuitry 106 can cause the filtered version of the labeled content 136 to be presented via the primary user device 102 but does not permit the sensitive information to be displayed at the primary user device 102 or at the HMD 104.

Figure 2:
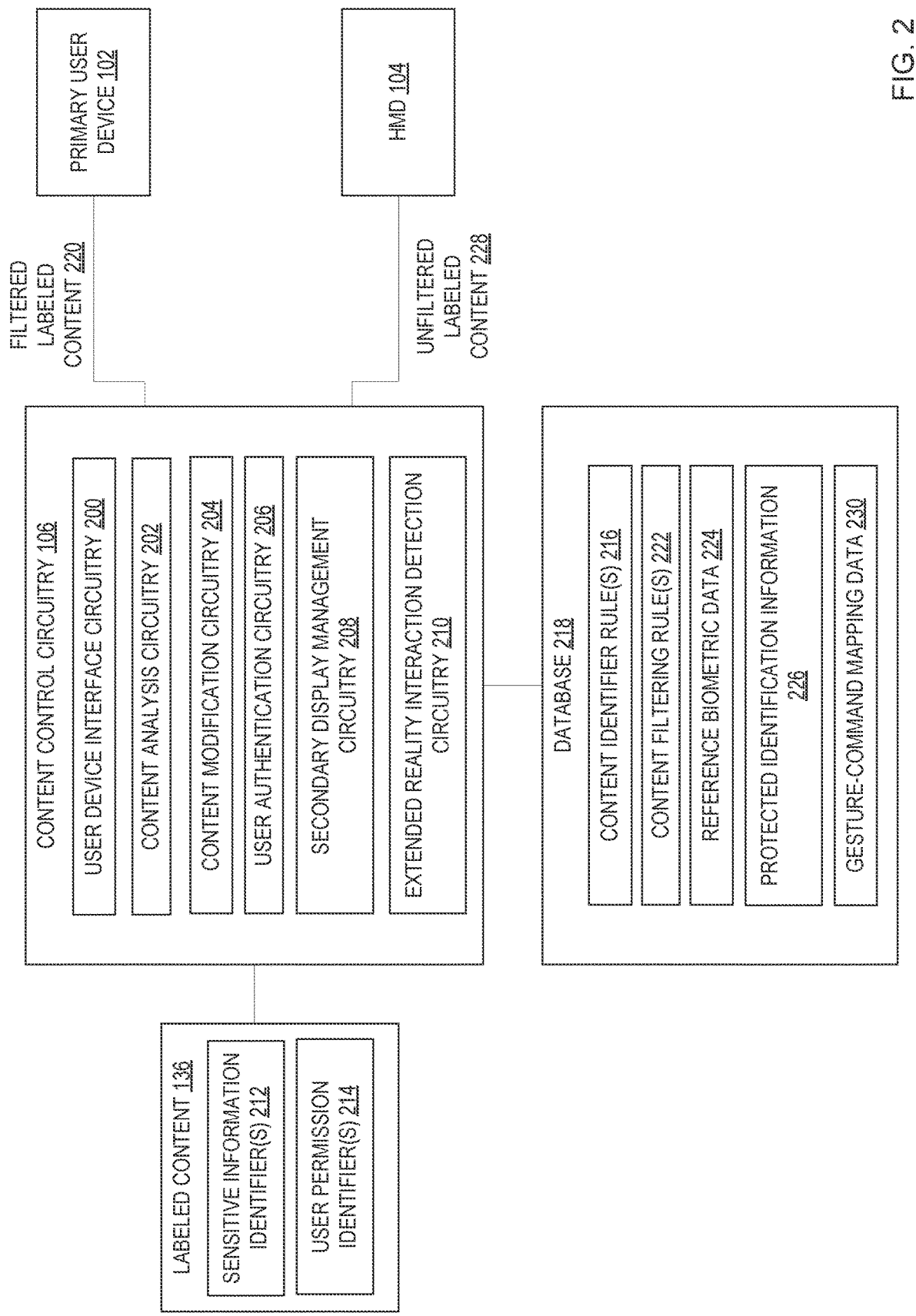
FIG. 2 is a block diagram of an example implementation of the content control circuitry of FIG. 1.

FIG. 2 is a block diagram of an example implementation of the content control circuitry 106 of FIG. 1 to selectively control presentation of content via the primary user device 102 and the secondary user device or HMD 104 of FIG. 1 based on detection of label(s) identifying the content as including sensitive information. The example content control circuitry 106 of FIG. 2 may be instantiated (e.g., creating an instance of, bring into being for any length of time, materialize, implement, etc.) by processor circuitry such as a central processing unit executing instructions. Additionally or alternatively, the content control circuitry 106 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example content control circuitry 106 of FIG. 2 includes example user device interface circuitry 200, example content analysis circuitry 202, example content modification circuitry 204, example user authentication circuitry 206, example secondary display management circuitry 208, and example extended reality interaction detection circuitry 210.

The user device interface circuitry 200 of the example content control circuitry 106 of FIG. 2 facilitates establishment of a communication channel between the primary user device 102 and the HMD 104. For example, the user device interface circuitry 200 can cause a wireless communicative coupling (e.g., via Bluetooth®) between the primary user device 102 and the HMD 104 to be established in response to signals output by the HMD 104. In some examples, the user device interface circuitry 200 facilitates the communicative coupling in response to authentication of the HMD 104 via one or more wireless authentication protocols. The user device interface circuitry 200 can cause a communicative coupling between the primary user device 102 and the HMD 104 to be established based on current or future wired or wireless communication protocols.

As shown in FIG. 2, the content control circuitry 106 accesses the labeled content 136 (e.g., from the storage device(s) 118 of the user device 102). In the illustrated example, one or more portions of the labeled content 136 include example sensitive information identifier(s) 212 (e.g., metadata tag(s)) and corresponding example user permission identifier(s) 214 indicating the user(s) who are authorized to view the sensitive information.

The content analysis circuitry 202 of the example content control circuitry 106 of FIG. 2 analyzes (e.g., scans, parses) the labeled content 136 to identify the sensitive information identifier(s) 212 (e.g., metadata tag(s), flag(s), etc.) associated with one or more portions of the labeled content 136. For example, the content analysis circuitry 202 scans metadata associated with respective frames of a video file to detect the sensitive information identifier(s) 212. As another example, the sensitive information identifier(s) 212 can be integrated with the content, such as a word processing document that includes highlighted portions representing confidential information. In some such examples, the content analysis circuitry 202 analyzes the document to detect the sensitive information identifies(s) 212.

The content analysis circuitry 202 recognizes the sensitive information identifier(s) 212 based on example content identifier rule(s) 216. The content identifier rule(s) 216 can define the types of sensitive information identifiers that are indicative of sensitive information, such as metadata tags. The content identifier rule(s) 216 can be defined based on the identifier(s) provided by the content preparation circuitry 138 of FIG. 1 for labeling content as including sensitive information. The content identifier rule(s) 216 can be stored in an example database 218. In some examples, the content control circuitry 106 includes the database 218. In some examples, the database 218 is located external to the content control circuitry 106 in a location accessible to the content control circuitry 106 as shown in FIG. 2.

In the example of FIG. 2, if the content analysis circuitry 202 detects sensitive information identifier(s) 212 in portion(s) (e.g., a video frame, a page of a multi-age document) of the labeled content 136, the content modification circuitry 204 filters the portion(s) of the labeled content 136 associated with the sensitive information identifier(s) 212 to generate example filtered labeled content 220 for presentation via the primary user device 102. As a result of the filtering, one or more viewing properties of the sensitive information is adjusted such that the sensitive information is not. In some examples, the content modification circuitry 204 causes the content associated with the sensitive information identifier(s) 212 to be hidden, removed, modified so as to become unreadable, etc. For example, the content modification circuitry 204 can cause image data in a frame of a video file including the sensitive information identifier(s) (e.g., tag(s)) in the metadata of the frame to be blurred. As another example, in response to identifying a flagged portion of text in a word processing document, the content modification circuitry 204 can cause the text to be redacted by applying a black box over the text.

In some examples, to filter the labeled content 136 and adjust the viewing properties of the sensitive information, the content modification circuitry 204 instructs the display controller circuitry 112 of the primary user device 102 to cause the display screen 108 to operate in a display mode such that the labeled content 136 and other content (e.g., other application windows presented via the displayed screen 108) are not viewable via the display screen 108. In response to the filtering instruction(s) from the content modification circuitry 204, the display controller circuitry 112 causes the display screen 108 to switch from a first display mode in which the display screen 108 displays content to a second or hidden display mode in which all or a substantial portion of the display screen 108 appears to be a solid color such as black, displays a pattern (e.g., a checkboard pattern), etc. For instance, the display control circuitry 112 can turn off light associated with the display screen 108 to implement the hidden display mode and cause the display screen 108 to appear black. As a result of the instruction for the display controller circuitry 112 to implement the hidden display mode, content is not visible via the display screen 108 of the primary user device 102. In some examples, the filtered content is replaced with a message overlaying a black screen, with the message indicating that the content is blocked, redacted, protected, etc.

In some examples, the content modification circuitry 204 does not apply the filter(s), but instead, instructs a user application associated with the labeled content 136 (e.g., a media player) to apply filter(s) to portion(s) of the labeled content 136 based on the detection of the sensitive information identifier(s) 212.

The example content modification circuitry 204 filters the labeled content 136 and/or generates instructions to provide filtered data based on example content filtering rule(s) 222 stored in the database 218. The content filtering rule(s) 222 can define the type(s) of filter(s) to be applied to content based on the sensitive information identifier(s) 212. For instance, the content filtering rule(s) 222 can define that when the metadata of a video frame includes a tag indicative of sensitive information, the content modification circuitry 204 should cause a blur filter or a scramble filter to be applied to the video frame.

The content modification circuitry 204 transmits the filtered labeled content 220 for presentation to the user via the display screen 108 of the primary user device 102. In some examples, the content modification circuitry 204 transmits the instruction to the display control circuitry 112 of the primary user device 102 of FIG. 1 to cause the display screen 108 to switch to the display mode in which the display screen 108 hides content from presentation (e.g., by appearing as a black screen).

The user authentication circuitry 206 of the example content control circuitry 106 of FIG. 2 verifies that the user of the HMD 104 is authorized to view the sensitive information of the labeled content 136. The user authentication circuitry 206 analyzes the labeled content 136 to identify the user permission identifier(s) 214 assigned to the portion(s) of the labeled content 136 in connection with the sensitive information identifier(s) 212 for those portion(s). As disclosed herein, the user permission identifier(s) 212 identify user(s) who are permitted to view the sensitive information in the labeled content 136.

In some examples, the user authentication circuitry 206 retrieves example reference biometric data 224 for the authorized user(s) identified in the user permission identifier(s) 214. The reference biometric data 224 can be stored in the database 218. The reference biometric data 224 can be generated by the biometric sensor(s) 134 of the HMD 104 during, for instance, calibration of the HMD 104 and/or by biometric scanners of other user devices (e.g., a smartphone).

The user authentication circuitry 206 compares the reference biometric data 224 for the user identified in the user permission identifier(s) 214 to biometric data generated by the biometric sensor(s) 134 of the HMD 104. For example, the user authentication circuitry 206 can compare reference iris scan data collected during, for instance, calibration of the HMD 104, to iris scan data generated by the biometric sensor(s) 134 for a user of the HMD 104. In some examples, the user authentication circuitry 206 performs the biometric authentication in response to a user of the primary user device 102 attempting to access, for instance, the labeled content 136 and/or a user application (e.g., a media player) that facilitates presentation of the labeled content 136 via the primary user device 102.

Additionally or alternatively, the user authentication circuitry 206 can authenticate the user of the HMD 104 based on example protected identification information 226 stored in the database 218. The protected identification information 226 can include, for instance, password(s), PIN(s), etc. for accessing the primary user device 102, the HMD 104, and/or the labeled content 136, where the protected identification information 226 is associated with authorized user(s) of the labeled content 136. In some such examples, the user authentication circuitry 206 verifies if the protected identification information provided by the user of the primary user device 102 matches the protected identification information 226 for an authorized user of the labeled content 136. In some examples, the user authentication circuitry 206 verifies that the protected identification information provided by the user of the HMD 104 matches the protected identification information 226 for an authorized user of sensitive information in the labeled content 136. In some examples, the user authentication circuitry 206 authenticates the user based on the protected identification information 226 and the protected identification information provided by the user via the primary user device 102 and the HMD 104. Additionally or alternatively, the user authentication circuitry 206 can verify the user based on the reference biometric data 224 and the protected identification information 226 provided at the primary user device 102 and/or the HMD 104.

The secondary display management circuitry 208 controls transmission of the labeled content 136 to the HMD 104 for presentation via the display screen 124 of the HMD 104. In the example of FIG. 2, when the content analysis circuitry 202 determines that portion(s) of the labeled content 136 includes sensitive information and the user authentication circuitry 206 has verified the user of the HMD 104 as an authorized user, the secondary display management circuitry 208 transmits an example unfiltered version 228 of the labeled content 136 for presentation at the HMD 104. The unfiltered labeled content 228 includes the sensitive information (e.g., confidential text, images to be censored, etc.).

In the example of FIG. 2, the secondary display management circuitry 208 causes the HMD 104 to present the unfiltered labeled content 228 at the same time or substantially same time that the content modification circuitry 204 causes the primary user device 102 to present the filtered labeled content 220. Thus, the unfiltered labeled content 228 including the sensitive information is displayed via the HMD 104 at the same time or substantially the same time that the filtered labeled content 220 is presented via the primary user device 102 (or at the same time the display screen 108 of the primary user device 102 is operating in the hidden display mode).

As disclosed herein, the HMD 104 can provide for augmented reality, virtual reality, and/or mixed reality displays. In examples in which the HMD 104 is an augmented reality device, at least a portion of the real-world environment including the primary user device 102 can be visible to the user while the user is wearing the HMD 104. In such examples, the secondary display management circuitry 208 can cause augmented reality content corresponding to the sensitive information to be presented via the HMD 104 such that the sensitive information appears to overlay or augment the filtered (e.g., redacted, censored) portions of the filtered labeled content 220 presented via the primary user device 102. Put another way, in some examples, the secondary display management circuitry 208 may only transmit the sensitive information of the labeled content 136 for display via the HMD 104.

For example, when the labeled content 136 includes a document, the secondary display management circuitry 208 can transmit the unredacted portions of the document for presentation at the HMD 104 as augmented reality content. As a result, when the user wears the HMD 104 and views the display screen 108 of the primary user device 102 through the HMD 104, the unredacted portions of the document appear to overlay the corresponding redacted portions of the filtered labeled content 220 displayed via the display screen 108 of the primary user device 102. In such instances, the secondary display management circuitry 208 transmits the portions of the document that are flagged with the sensitive information indicator(s) 214 for presentation. When the user of the HMD 104 views the content via the HMD 104, the sensitive information appears to be aligned with, overlaying, or replacing the redacted portions displayed via the primary user device 102. Thus, when the user wears the HMD 104, the filtered labeled content 220 displayed at the primary user device 102 is augmented with the sensitive information that is not otherwise visible via the primary user device 102. However, in other examples, the secondary display management circuitry 208 can transmit the sensitive information and the non-sensitive information (e.g., an entire portion of the labeled content 136) for presentation at the HMD 104.

In examples in which the HMD 104 is a virtual reality device, the virtual reality content presented via the HMD 104 replaces the real-world environment (i.e., the display screen 108 of the primary user device 102 is not visible to the user while the user is wearing the HMD 104). In such examples, the secondary display management circuitry 208 transmits the unfiltered labeled content 228 to be displayed via the HMD 104, where the unfiltered labeled content 228 includes the sensitive information and the non-sensitive information (i.e., corresponds to the labeled content 136 and not only the sensitive information of the labeled content 136). For example, the secondary display management circuitry 208 can cause an original version of a document without any redacted portions to be presented as virtual reality content at the HMD 104.

In examples in which the HMD 104 is a mixed reality device, the secondary display management circuitry 208 can cause the unfiltered labeled content 228 to be displayed via the HMD 104, which can include the sensitive information of the labeled content 136 and, in some instance, the non-sensitive content. In such examples, filtered labeled content 220 and the unfiltered labeled content 228 may be visible to the user wearing the HMD 104 as part of the integration of virtual and real-world environments via mixed reality.

In some examples, prior to transmitting the unfiltered labeled content 228 to the HMD 104, the secondary display management circuitry 208 verifies that the user is wearing the HMD 104. The secondary display management circuitry 208 can verify that the user is wearing the HMD 104 based on signals output by proximity sensor(s) 135 (FIG. 1) of the HMD 104. The signal(s) from the proximity sensor(s) 135 of the HMD 104 can indicate that, for instance, a portion of the HMD 104 is proximate to an ear of the user and, thus, the user is likely to be wearing the HMD 104.

In the example of FIG. 2, the extended reality interaction detection circuitry 210 detects user interaction(s) with the unfiltered labeled content 228 displayed via the HMD 104. The interactions can include, for instance, gestures such as hand gestures, eye movements, etc. The extended reality interaction detection circuitry 210 can detect the gestures based on, for examples, signal data generated by sensor(s) 135 of the HMD 104 (e.g., accelerometers, eye tracking sensors) and map the features to user commands based on example gesture-command mapping data 230 stored in the database 218. The commands can enable the user of the HMD 104 to replicate mouse and/or keyboard inputs that would otherwise been provided via the primary user device 102. For instance, when the unfiltered labeled content 228 includes a document or a portion thereof, the extended reality interaction detection circuitry 210 can interpret a gesture including a finger moving in a substantially straight line as a command to add underlining to text of the document displayed via the HMD 104.

In use, the content analysis circuitry 202 analyzes portion(s) of the labeled content 136 that have not yet been presented to detect the sensitive information identifier(s) 212 (e.g., tags, metadata). The content modification circuitry 204 filters the labeled content 136 based on detection of the sensitive information for presentation via the primary user device 102 while the secondary display management circuitry 208 provides the unfiltered content 228 for presentation to the authenticated user via the HMD 104.

In some examples, the secondary display management circuitry 208 determines that the user has removed the HMD 104 (e.g., based on changes in signal data from the proximity sensor(s) 135 of the HMD 104). In some such examples, the display screen 108 of the primary user device 102 may be operating in the hidden display mode in which content is not visible via the display screen 108 (e.g., the display screen 108 appears to be a solid color such as black). For instance, when the HMD 104 is a virtual reality device and the user removes the VR-based HMD 104, the content modification circuitry 204 can instruct the display control circuitry 112 to cause the display screen 108 to operate in the hidden display mode. Because primary user device 102 is not visible to the user when the user views the unfiltered labeled content 228 as virtual reality content via the HMD 104, content presented via the display screen 108 of the primary user device 102 can be hidden to prevent other individuals from viewing the content while the user is wearing the HMD 104. When the user removes the virtual-reality based HMD 104, the content modification circuitry 204 can instruct the display control circuitry 112 of the primary user device 102 to cause the display screen 108 to switch back to the display mode in which content is visible via the display screen 108. In such examples, the content modification circuitry 204 can transmit the filtered labeled content 220 for display via the primary user device 102 to prevent the sensitive information from being displayed when the display screen is operating in the first display mode.

In other examples, the filtered labeled content 220 is displayed via the display screen 108 of the primary user device 102 (i.e., instead of operating in the hidden display mode) and the secondary display management circuitry 208 detects that the user has removed the HMD 104. In such examples, the content modification circuitry 204 can continue to instruct the display control circuitry 112 of the primary user device 102 to cause the filtered labeled content 220 to be presented. Because the protected or filtered version of the labeled content 136 is already being presented via the primary user device 102, no change to the content visible via the display screen 108 of the primary user device 102 is needed.

In some examples, the content control circuitry 106 includes means for interfacing. For example, the means for interfacing may be implemented by the user device interface circuitry 200. In some examples, the user device interface circuitry 200 may be instantiated by processor circuitry such as the example processor circuitry 612 of FIG. 6. For instance, the user device interface circuitry 200 may be instantiated by the example general purpose processor circuitry 700 of FIG. 7 executing machine executable instructions such as that implemented by at least block 518 of FIG. 5. In some examples, the user device interface circuitry 200 may be instantiated by hardware logic circuitry, which may be implemented by an ASIC or the FPGA circuitry 800 of FIG. 8 structured to perform operations corresponding to the machine readable instructions. Additionally or alternatively, the user device interface circuitry 200 may be instantiated by any other combination of hardware, software, and/or firmware. For example, the user device interface circuitry 200 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the content control circuitry 106 includes means for analyzing. For example, the means for analyzing may be implemented by the content analysis circuitry 202. In some examples, the content analysis circuitry 202 may be instantiated by processor circuitry such as the example processor circuitry 612 of FIG. 6. For instance, the content analysis circuitry 202 may be instantiated by the example general purpose processor circuitry 700 of FIG. 7 executing machine executable instructions such as that implemented by at least blocks 504, 506 of FIG. 5. In some examples, the content analysis circuitry 202 may be instantiated by hardware logic circuitry, which may be implemented by an ASIC or the FPGA circuitry 800 of FIG. 8 structured to perform operations corresponding to the machine readable instructions. Additionally or alternatively, the content analysis circuitry 202 may be instantiated by any other combination of hardware, software, and/or firmware. For example, the content analysis circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the content control circuitry 106 includes means for modifying. For example, the means for modifying may be implemented by the content modification circuitry 204. In some examples, the content modification circuitry 204 may be instantiated by processor circuitry such as the example processor circuitry 612 of FIG. 6. For instance, the content modification circuitry 204 may be instantiated by the example general purpose processor circuitry 700 of FIG. 7 executing machine executable instructions such as that implemented by at least blocks 508, 520, 522 of FIG. 5. In some examples, the content modification circuitry 204 may be instantiated by hardware logic circuitry, which may be implemented by an ASIC or the FPGA circuitry 800 of FIG. 8 structured to perform operations corresponding to the machine readable instructions. Additionally or alternatively, the content modification circuitry 204 may be instantiated by any other combination of hardware, software, and/or firmware. For example, the content modification circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the content control circuitry 106 includes means for authenticating. For example, the means for authenticating may be implemented by the user authentication circuitry 206. In some examples, the user authentication circuitry 206 may be instantiated by processor circuitry such as the example processor circuitry 612 of FIG. 6. For instance, the user authentication circuitry 206 may be instantiated by the example general purpose processor circuitry 700 of FIG. 7 executing machine executable instructions such as that implemented by at least blocks 510, 512, 514, 516 of FIG. 5. In some examples, the user authentication circuitry 206 may be instantiated by hardware logic circuitry, which may be implemented by an ASIC or the FPGA circuitry 800 of FIG. 8 structured to perform operations corresponding to the machine readable instructions. Additionally or alternatively, the user authentication circuitry 206 may be instantiated by any other combination of hardware, software, and/or firmware. For example, the user authentication circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the content control circuitry 106 includes means for managing. For example, the means for managing may be implemented by the secondary display management circuitry 208. In some examples, the secondary display management circuitry 208 may be instantiated by processor circuitry such as the example processor circuitry 612 of FIG. 6. For instance, the secondary display management circuitry 208 may be instantiated by the example general purpose processor circuitry 700 of FIG. 7 executing machine executable instructions such as that implemented by at least block 524 of FIG. 5. In some examples, the secondary display management circuitry 208 may be instantiated by hardware logic circuitry, which may be implemented by an ASIC or the FPGA circuitry 800 of FIG. 8 structured to perform operations corresponding to the machine readable instructions. Additionally or alternatively, the secondary display management circuitry 208 may be instantiated by any other combination of hardware, software, and/or firmware. For example, the secondary display management circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the content control circuitry 106 includes means for detecting. For example, the means for detecting may be implemented by the extended reality interaction detection circuitry 210. In some examples, the extended reality interaction detection circuitry 210 may be instantiated by processor circuitry such as the example processor circuitry 612 of FIG. 6. For instance, the extended reality interaction detection circuitry 210 may be instantiated by the example general purpose processor circuitry 700 of FIG. 7 executing machine executable instructions such as that implemented by at least block 526 of FIG. 5. In some examples, the extended reality interaction detection circuitry 210 may be instantiated by hardware logic circuitry, which may be implemented by an ASIC or the FPGA circuitry 800 of FIG. 8 structured to perform operations corresponding to the machine readable instructions. Additionally or alternatively, the extended reality interaction detection circuitry 210 may be instantiated by any other combination of hardware, software, and/or firmware. For example, the extended reality interaction detection circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the content control circuitry 106 of FIG. 1 is illustrated in FIG. 2, one or more of the elements, processes, and/or devices illustrated in FIG. 2 may be combined, divided, re-arranged, omitted, eliminated, and/or implemented in any other way. Further, the example user device interface circuitry 200, the example content analysis circuitry 202, the example content modification circuitry 204, the example user authentication circuitry 206, the example secondary display management circuitry 208, the example extended reality interaction detection circuitry 210, the example database 218 and/or, more generally, the example content control circuitry 106 of FIG. 1, may be implemented by hardware alone or by hardware in combination with software and/or firmware. Thus, for example, any of the example user device interface circuitry 200, the example content analysis circuitry 202, the example content modification circuitry 204, the example user authentication circuitry 206, the example secondary display management circuitry 208, the example extended reality interaction detection circuitry 210, the example database 218 and/or, more generally, the example content control circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example content control circuitry 106 of FIG. 1 may include one or more elements, processes, and/or devices in addition to, or instead of, those illustrated in FIG. 2, and/or may include more than one of any or all of the illustrated elements, processes, and devices.

Figure 3:
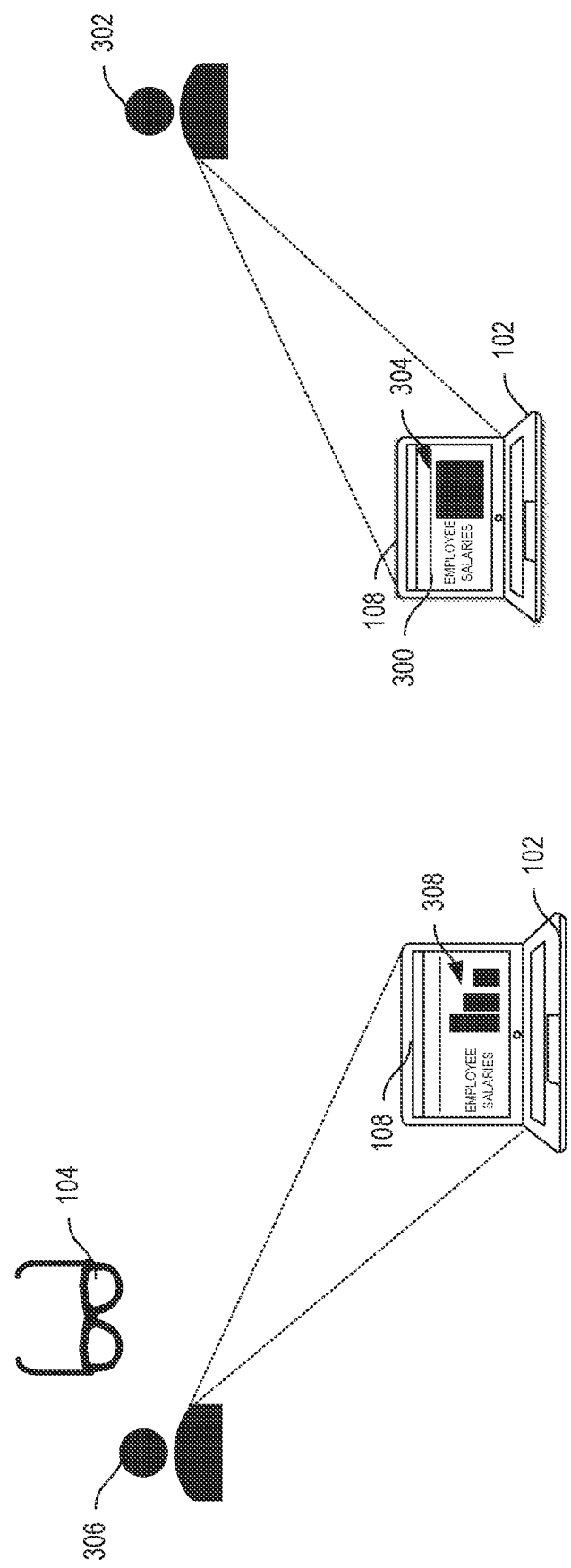
FIG. 3 is diagram illustrating example content visible via the example primary user device of FIG. 1 and the example head-mounted device of FIG. 1 based on filtering of sensitive information in the content by the example content control circuitry of FIGS. 1 and/or 2.

FIG. 3 is a diagram illustrating content (e.g., a document) visible via the example primary user device 102 of FIG. 1 and the example HMD 104 of FIG. 1 based on filtering of sensitive information in the content by example content control circuitry 106 of FIGS. 1 and/or 2.

As shown in the example of FIG. 3, example filtered content 300 is visible to an example observer 302 when the observer 302 views the display screen 108 of the primary user device 102. For instance, a portion of the filtered content 300 includes example redacted content 304. The redacted content 304 can be generated by the content modification circuitry 204 of FIG. 2 to hide sensitive information in the content (e.g., based on the detection of the sensitive information identifier(s) 212 assigned to the content).

Conversely, in the example of FIG. 3, unfiltered content including example sensitive information 308 is visible to an example authenticated user 306 while wearing the HMD 104. In the example of FIG. 3, the HMD 104 is an augmented reality device. As shown in FIG. 3, the secondary display management circuitry 208 of FIG. 2 causes the sensitive information 308 to be presented via the HMD 104 such that, to the user 306 wearing the HMD 104, the sensitive information 308 appears to overlay the redacted content 304 that is presented via the primary user device 102 and visible to the observer 302.

Figure 4:
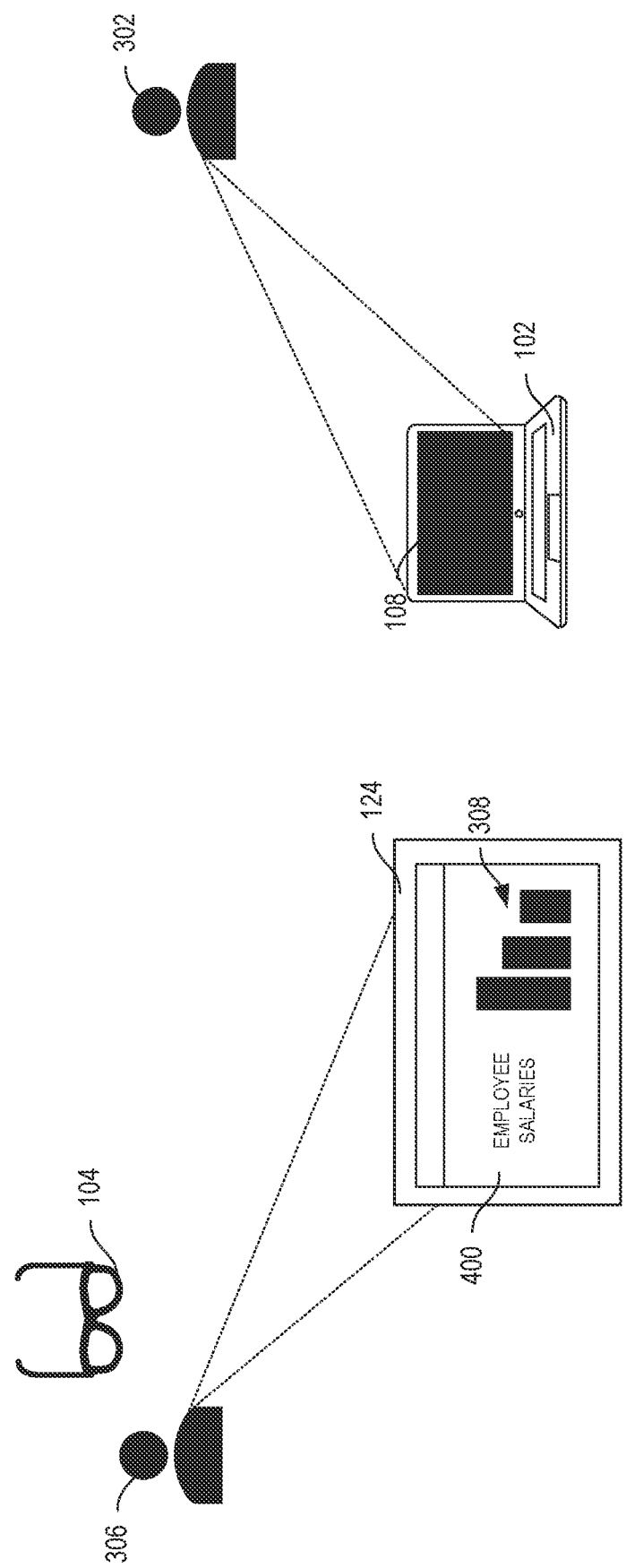
FIG. 4 is another diagram illustrating example content visible via the example primary user device of FIG. 1 and the example head-mounted device of FIG. 1 based on filtering of sensitive information in the content by the example content control circuitry of FIGS. 1 and/or 2.

FIG. 4 is another diagram illustrating content (e.g., a document) visible via the example primary user device 102 of FIG. 1 and the example HMD 104 of FIG. 1 based on filtering of sensitive information in the content by example content control circuitry 106 of FIGS. 1 and/or 2.

In the example of FIG. 4, in response to the detection of sensitive information in content to be displayed, the content modification circuitry 204 of FIG. 2 instructs the display control circuitry 112 of FIG. 1 to cause the display screen 108 of the primary user device 102 to operate in the hidden display mode. As shown in FIG. 4, no content is visible to the observer 302 when viewing the display screen 108 of the primary user device 102 (e.g., because the display control circuitry 112 caused the screen light to turn off). For instance, the display screen 108 appears black to the observer 302.

Conversely, example unfiltered content 400 is visible to the authenticated user 306 while wearing the HMD 104. In the example of FIG. 4, the HMD 104 is a virtual reality device. As shown in FIG. 4, the secondary display management circuitry 208 of FIG. 2 causes the unfiltered content 400 to be presented via the display screen 124 of the HMD 104. In the example of FIG. 4, the unfiltered content 400 includes the sensitive information 308 as well as non-sensitive information presented in a virtual reality format (e.g., the entire document presented in virtual reality format).

Although the examples of FIGS. 3 and 4 are discussed in connection with content including a document, other types of content, such as an image, a video frame, etc., can be analyzed by the content control circuitry 106 of FIGS. 1 and/or 2 and presented via the primary user device 102 and the HMD 104 in filtered and unfiltered formats, respectively, based on the detection of sensitive information. Also, the filtered content can be presented in different formats than shown in FIGS. 3 and/or 4. For instance, in the example of FIG. 4, the content can appear as blurred or scrambled when the display screen 108 of the primary user device 102 is operating in the hidden display mode.

Figure 5:
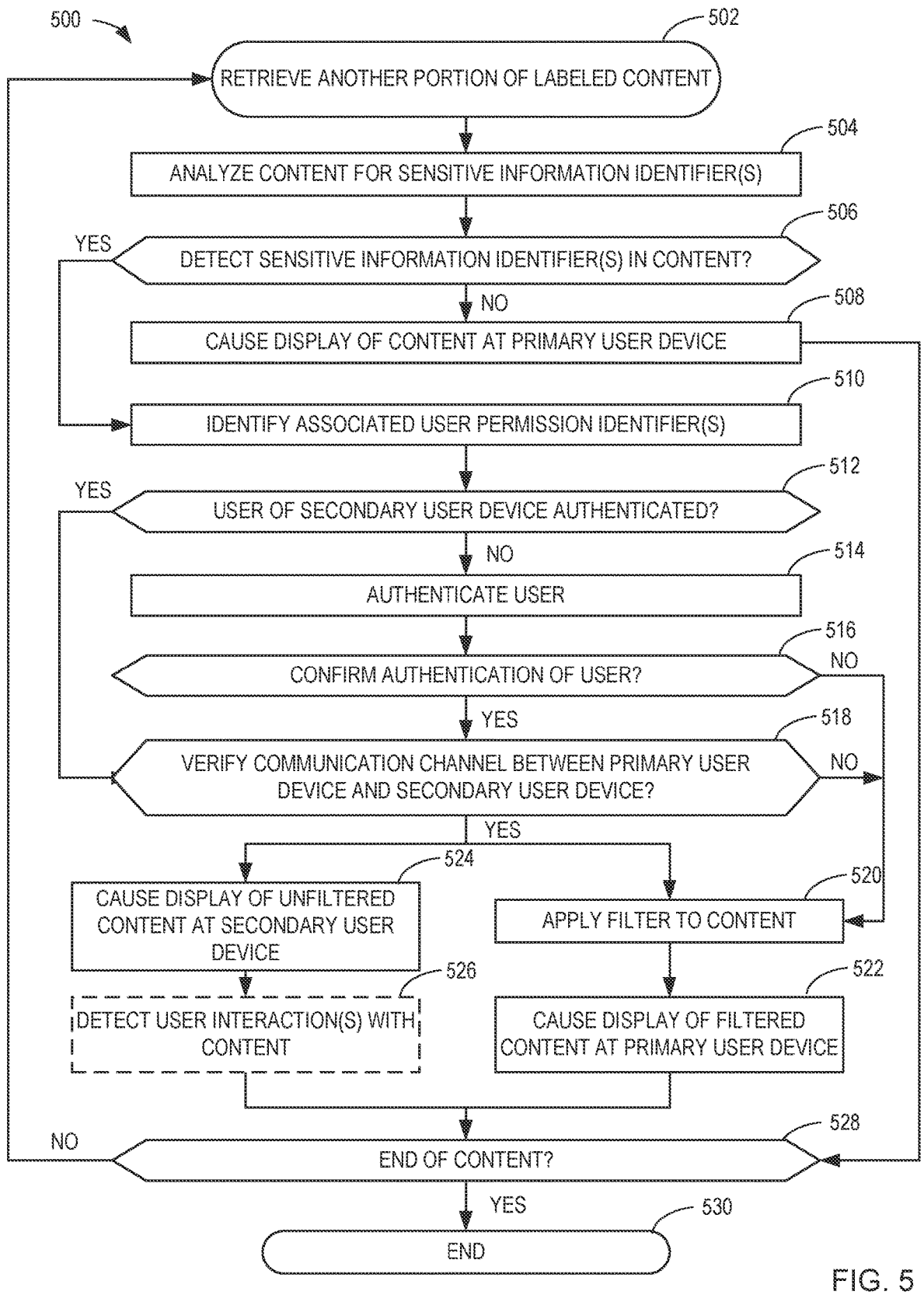
FIG. 5 is a flowchart representative of example machine readable instructions and/or example operations that may be executed by example processor circuitry to implement the content control circuitry of FIG. 2.

A flowchart representative of example hardware logic circuitry, machine readable instructions, hardware implemented state machines, and/or any combination thereof for implementing the content control circuitry 106 of FIG. 2 is shown in FIG. 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example content control circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to detect sensitive information (e.g., confidential information, images to be censored) and to control display of the sensitive information via user device(s).

The machine readable instructions and/or the operations 500 of FIG. 5 begin at block 502, at which the content analysis circuitry 202 of the content control circuitry 106 of FIG. 2 retrieves a portion of the labeled content 136. At block 504, the content analysis circuitry 202 analyzes (e.g., scans) the labeled content 136 to detect sensitive information identifier(s) 212 (e.g., metadata tags, flags, etc.) assigned to the labeled content 136 via, for instance, the content preparation circuitry 138. At block 506, the content analysis circuitry 202 determines if any sensitive information identifier(s) 212 were identified in the portion of the labeled content 136. At block 508, if the content analysis circuitry 202 does not identify sensitive information identifier(s) 212 in the portion of the labeled content 136, the content modification circuitry 204 transmits the portion of the labeled content 136 for display at the primary user device 102 without filtering.

If the content analysis circuitry 202 detects sensitive information identifier(s) 212 in the portion of the labeled content 136, the user authentication circuitry 206 identifies user permission identifier(s) 214 associated with the sensitive information identifier(s) 212 at block 510. The user permission identifier(s) 214 identify user(s) who are authorized to view the sensitive information. At block 512, the user authentication circuitry 206 determines if the user of the secondary user device or HMD 104 has been authenticated (e.g., in connection with a previously analyzed portion of the labeled content 136). At block 514, if the user of the HMD 104 has not been authenticated, the user authentication circuitry 206 authenticates the user. In some examples, the user authentication circuitry 206 authenticate the user based on, for example, the reference biometric data 224 associated with authorized user(s) and the biometric data collected via the biometric sensor(s) 134 of the HMD 104 for the current user of the HMD 104. Additionally or alternatively, the user authentication circuitry 206 can authenticate the user of the HMD 104 based on protected identification information 226 (e.g., a password) provided via the primary user device 102 and/or the HMD 104.

At block 516, if the user authentication circuitry 206 successfully authenticates the user of the HMD 104 as an authorized user of the sensitive information in the labeled content 136, control proceeds to block 518, where the user device interface circuitry 200 verifies a communication channel between the primary user device 102 and the HMD 104. The user device interface circuitry 200 can verify the communication channel (e.g., a Bluetooth® channel) based on wireless authentication protocols.

In response to the verification of the communication channel between the primary user device 102 and the HMD 104, at block 520, the content modification circuitry 204 applies a filter to the labeled content 136 to adjust the viewing properties of the sensitive information and to generate filtered labeled content 220 for presentation via the display screen 108 of the primary user device 102. In some examples, the content modification circuitry 204 filters the labeled content 136 by generating redacted content (e.g., the redacted content 304 of FIG. 3) to remove the sensitive information from the labeled content 136. In some examples, the content modification circuitry 204 applies a filter to the labeled content, such as a blur filter. In some examples, the content modification circuitry 204 instructs the display control circuitry 112 of the primary user device 102 to cause the display screen 108 to operate in a hidden display mode in which content is not visible via the display screen 108 (e.g., the display screen 108 appears black). In some examples, the content modification circuitry 204 generates instructs for the user application(s) 116 associated with the labeled content 136 to filter otherwise modify the content to hide the sensitive information. The content modification circuitry 204 generates the filtered content 220 and/or the filtering instructions(s) based on the content filtering rule(s) 222 stored in the database 218. At block 522, the content modification circuitry 204 transmits the filtered labeled content 220 and/or instructions for the display control circuitry 112 and/or the user application(s) 116 to cause the filtered content to be displayed at the primary user device 102.

In response to the verification of the communication channel between the primary user device 102 and the HMD 104, the secondary display management circuitry 208 causes unfiltered labeled content 228 to be presented via the HMD 104. In some examples, the secondary display management circuitry 208 causes the sensitive information portion(s) of the labeled content 136 to presented as augmented reality content such that the sensitive information portion(s) (e.g., the sensitive information portion(s) 308 of FIG. 3) appear to overlay the redacted content (e.g., the redacted content 304 of FIG. 3) when the user views the display screen 108 of the primary user device 102 while the user is wearing the HMD 104. In some examples, the secondary display management circuitry 208 cause the sensitive and unsensitive portions of the labeled content 136 to be presented as, for instance, virtual reality content at the HMD 104.

In some examples, at block 526, the extended reality interaction detection circuitry 210 detects user interaction(s) with the content via the HMD 104. The user interaction(s) can include, for instance, gesture(s), and the extended reality interaction detection circuitry 210 can map the gesture(s) to commands based on the gesture-command mapping data 230 stored in the database 218.

In the example of FIG. 5, if the user authentication circuitry 206 is unable to authenticate the user of the HMD 104 or if the user device interface circuitry 200 is unable to verify a communication channel between the primary user device 102 and the HMD 104, the content modification circuitry 204 applies the filter to the labeled content 220 or generates the filtering instructions for the display control circuitry 112 and/or the user application(s) 116. As such, the content modification circuitry 204 prevents the sensitive information from being displayed to unauthorized users and/or observers via the primary user device 102 when the user of the HMD 104 cannot be authenticated. Also, in such instances, content is not presented via the HMD 104.

The content analysis circuitry 202 determines if there is another portion of the labeled content 136 (e.g., another video frame) that is to be analyzed (e.g., a video frame to be presented subsequent to a video frame that was previously analyzed) at block 528. If there are no additional portions of the labeled content 136 to be analyzed, the instructions 500 of FIG. 5 end at block 530.

Figure 6:
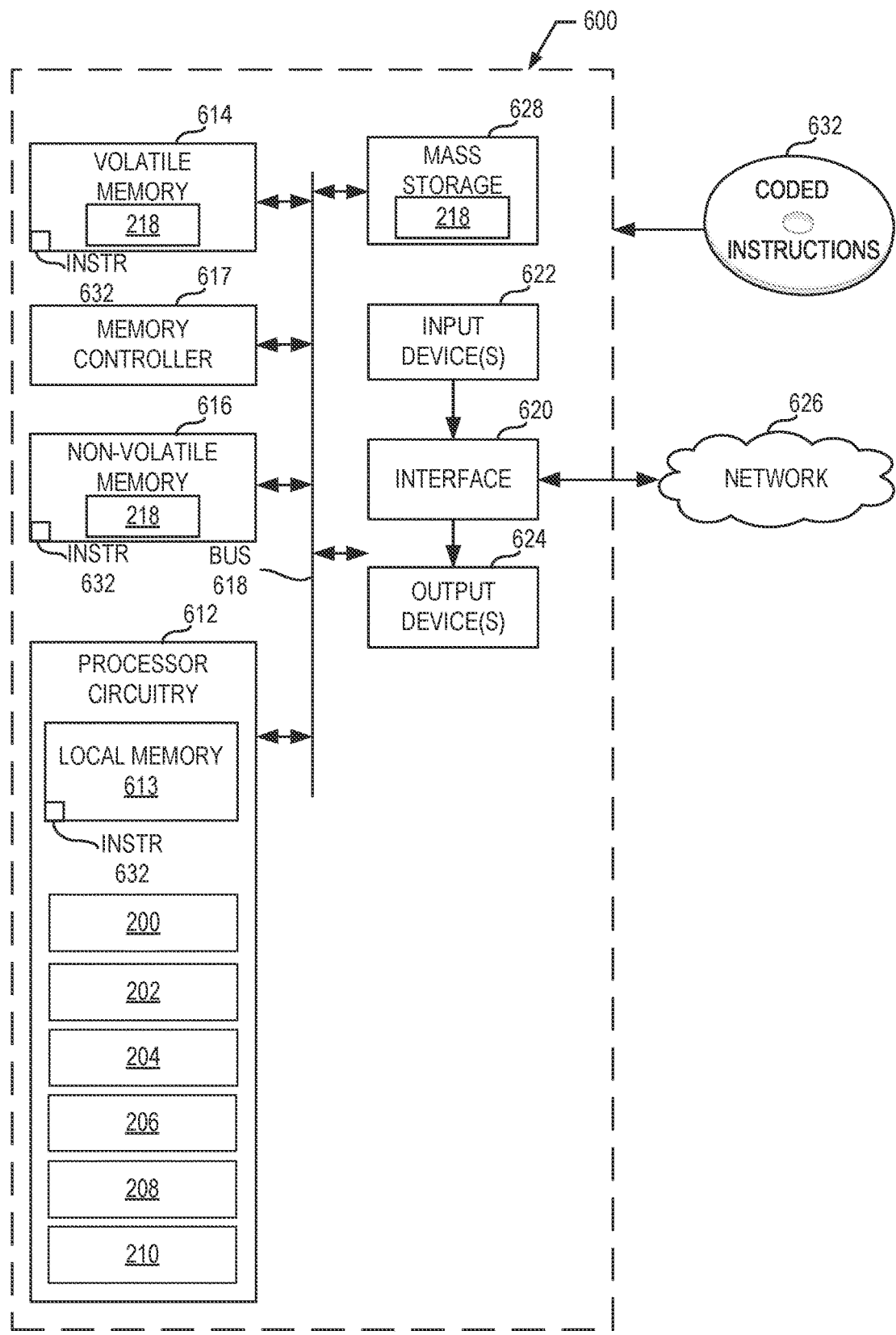
FIG. 6 is a block diagram of an example processing platform including processor circuitry structured to execute the example machine readable instructions and/or the example operations of FIG. 5 to implement the content control circuitry of FIG. 2.

FIG. 6 is a block diagram of an example processor platform 600 structured to execute and/or instantiate the machine readable instructions and/or the operations of FIG. 5 to implement the content control circuitry 106 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example user device interface circuitry 200, the example content analysis circuitry 202, the example content modification circuitry 204, the example user authentication circuitry 206, the example secondary display management circuitry 208, and the example extended reality interaction detection circuitry 210.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
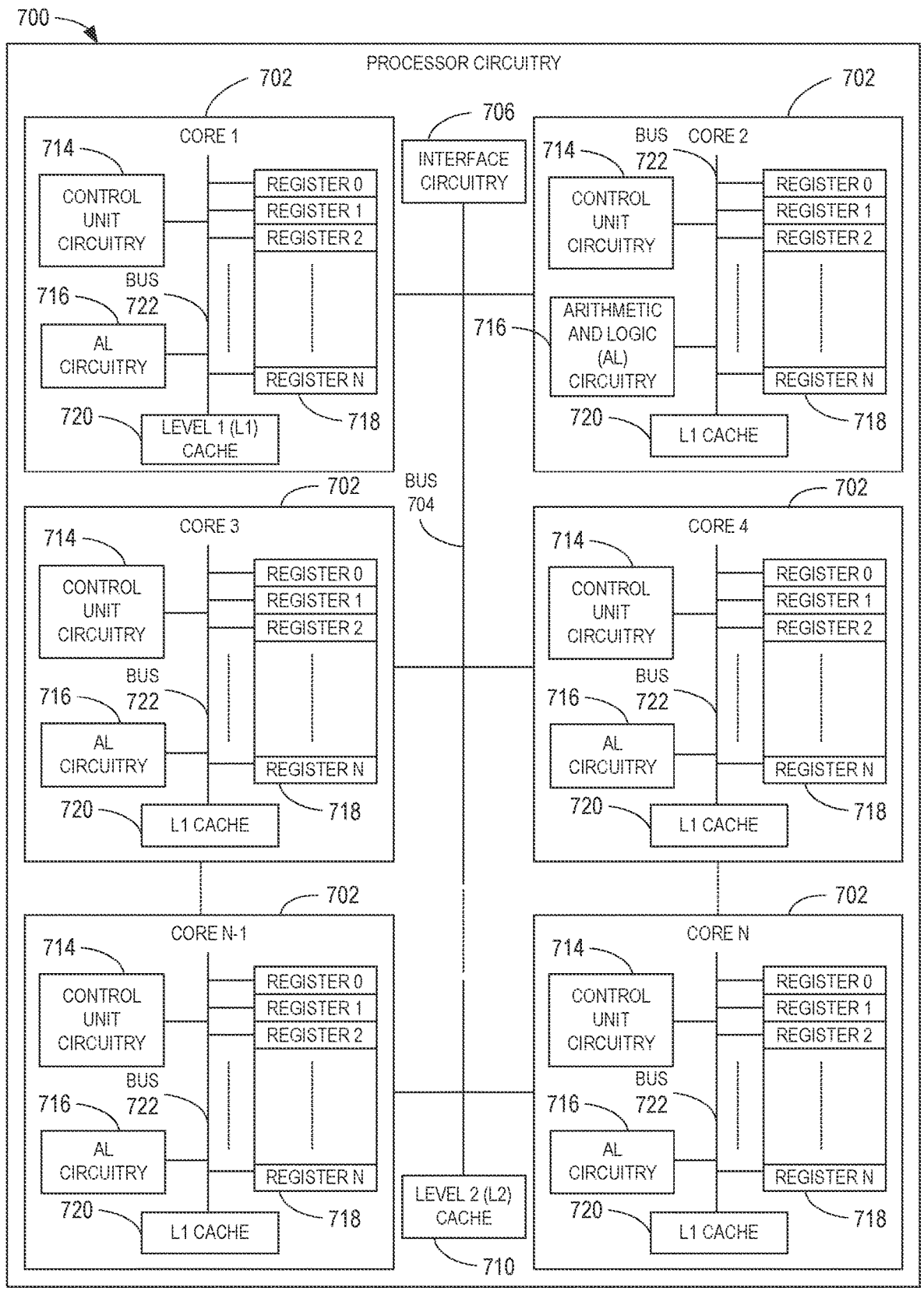
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a general purpose microprocessor 700. The general purpose microprocessor circuitry 700 executes some or all of the machine readable instructions of the flowchart of FIG. 5 to effectively instantiate the circuitry of FIG. 2 as logic circuits to perform the operations corresponding to those machine readable instructions. In some such examples, the circuitry of FIG. 2 is instantiated by the hardware circuits of the microprocessor 700 in combination with the instructions. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by a first example bus 704. In some examples, the first bus 704 may implement a communication bus to effectuate communication associated with one(s) of the cores 702. For example, the first bus 704 may implement at least one of an Inter-Integrated Circuit (I2C) bus, a Serial Peripheral Interface (SPI) bus, a PCI bus, or a PCIe bus. Additionally or alternatively, the first bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The second bus 722 may implement at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
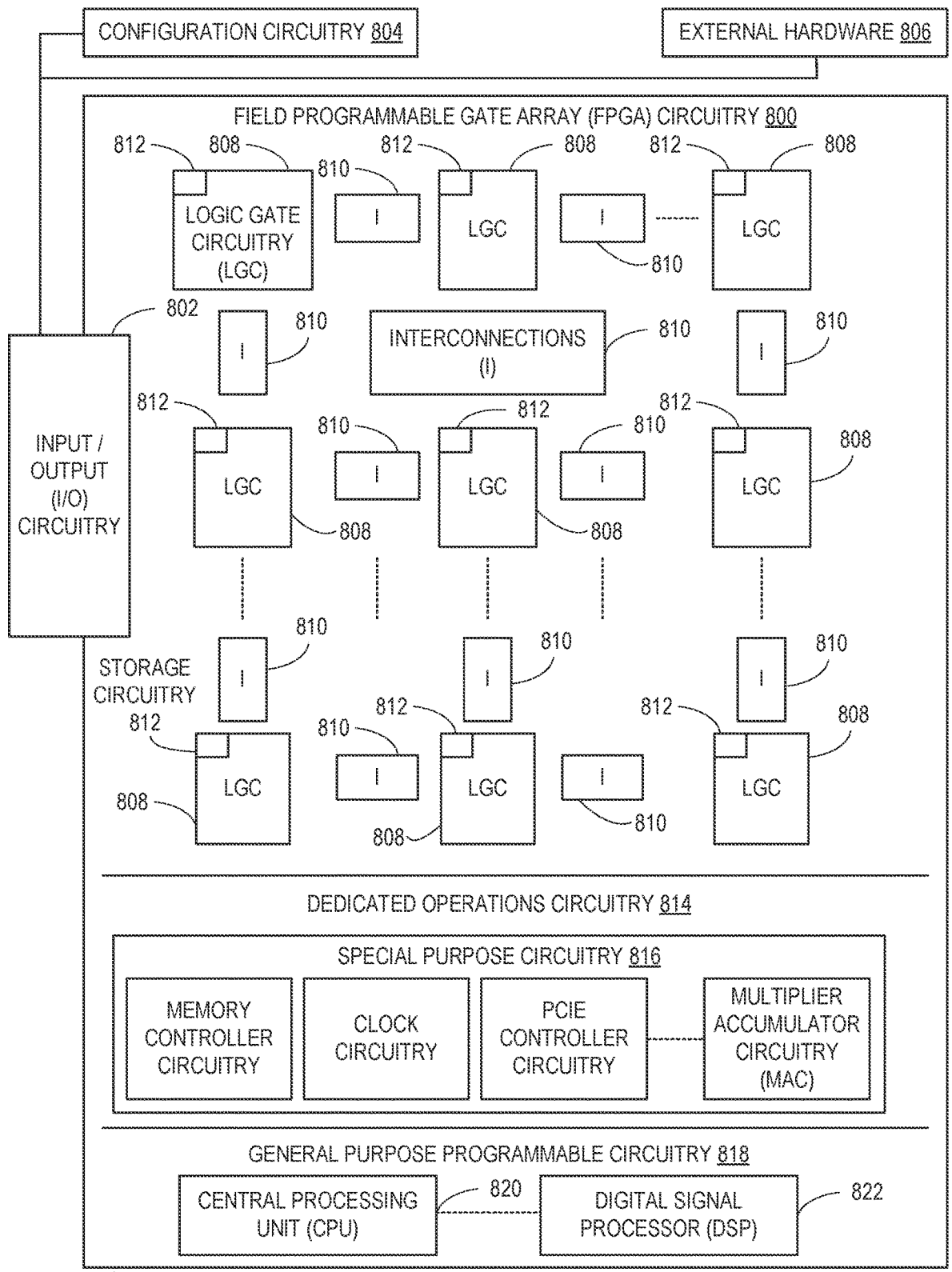
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5. As such, the FPGA circuitry 800 may be structured to effectively instantiate some or all of the machine readable instructions of the flowchart of FIG. 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 5 may be executed by one or more of the cores 702 of FIG. 7, a second portion of the machine readable instructions represented by the flowchart of FIG. 5 may be executed by the FPGA circuitry 800 of FIG. 8, and/or a third portion of the machine readable instructions represented by the flowchart of FIG. 5 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
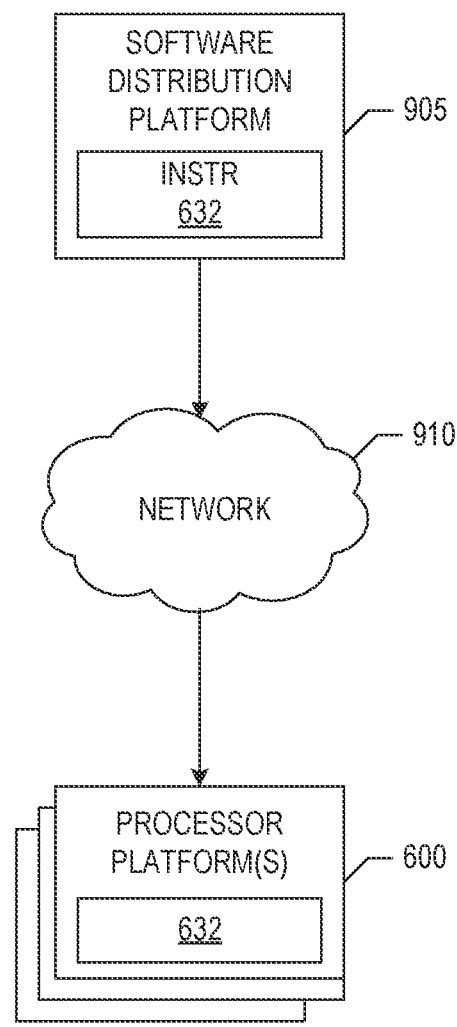
FIG. 9 is a block diagram of an example software distribution platform (e.g., one or more servers) to distribute software (e.g., software corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 500 of FIG. 5, as described above. The one or more servers of the example software distribution platform 905 are in communication with a network 910, which may correspond to any one or more of the Internet and/or any of the example networks 626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 500 of FIG. 5, may be downloaded to the example processor platform 600, which is to execute the machine readable instructions 632 to implement the content control circuitry 106. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that provide for control of content displayed via user device(s) based on detection of identifier(s) indicating sensitive information (e.g., confidential information, content of a violent nature) in the content. In response to detecting the identifiers (e.g., metadata tags) indicative of sensitive information in the content, examples disclosed herein automatically filter the content to prevent the sensitive information from being displayed via a user device such as a laptop. As a result, examples disclosed herein prevent or substantially reduce the risk of the sensitive information being seen by individuals in the environment other the intended viewer. Examples disclosed cause the content including the sensitive information to be presented via a second user device, such as a head-mounted device to enable private viewing of the sensitive information. Examples disclosed authenticate a user of the secondary user device before permitting the sensitive information to be displayed via the secondary user device to prevent unauthorized exposure of the sensitive information.

Example apparatus, systems, methods, and articles of manufacture for content display control at electronic user devices are disclosed herein. Further examples and combinations thereof include the following:

Example 1 includes an apparatus comprising at least one memory; instructions; and processor circuitry to execute the instructions to detect a sensitive information identifier associated with content, the sensitive information identifier to indicate the content includes sensitive information; filter the content to change a viewing property of the sensitive information; cause a first display screen associated with a first device to present the filtered content; and cause a second display screen associated with a second device to present the sensitive information during presentation of the filtered content by the first display screen associated with the first device.

Example 2 includes the apparatus of example 1, wherein the processor circuitry is to authenticate a user of the second device; and cause the second display screen associated with the second device to present the sensitive information in response to successful authentication of the user.

Example 3 includes the apparatus of examples 1 or 2, wherein the processor circuitry is to identify a user permission identifier associated with the content; retrieve reference biometric data based on the user permission identifier; and authenticate the user based on the reference biometric data and biometric data associated with the user.

Example 4 includes the apparatus of any of examples 1-3, wherein the processor circuitry is to filter the content by redacting one or more portions of the content including the sensitive information.

Example 5 includes the apparatus of any of examples 1-4, wherein the processor circuitry is to filter the content by instructing display control circuitry of the first device to change a display mode of the first display screen.

Example 6 includes the apparatus of any of examples 1-5, wherein the processor circuitry is to cause the sensitive information to be presented by the second display screen associated with the second device as augmented reality content or virtual reality content.

Example 7 includes the apparatus of any of examples 1-6, wherein the processor circuitry is to detect the sensitive information identifier based on metadata of the content.

Example 8 includes a system comprising a first compute device having a first display screen; a second compute device having a second display screen, the second display screen to provide for a more restricted viewing area than the first display screen; and processor circuitry to detect an identifier indicative of sensitive information in a portion of the content; cause the sensitive information in the portion of the content to be modified to generate a first version of the content; cause the first display screen to present the first version of the content; and cause the second display screen to present a second version of the content, the sensitive information unmodified in the second version of the content.

Example 9 includes the system of example 8, wherein the second compute device is head-mounted device.

Example 10 includes the system of examples 8 or 9, wherein the processor circuitry is to cause the sensitive information in the portion of the content to be modified by redacting the sensitive information in the portion of the content.

Example 11 includes the system of any of examples 8-10, wherein the second version of the content includes augmented reality content corresponding to the redacted sensitive information in the first version of the content.

Example 12 includes the system of any of examples 8-11, wherein the processor circuitry is to cause the sensitive information in the portion of the content to be modified by causing the first display screen to operate in a display mode in which the content is not presented by the first display screen.

Example 13 includes the system of any of examples 8-12, wherein the portion is a first portion and the processor circuitry is to determine that a second portion of the content is not associated with an identifier indicative of sensitive information; and cause the first display screen to present the second portion of the content without modification.

Example 14 includes the system of any of examples 8-13, wherein the second compute device includes a biometric sensor to identify biometric data of a user and the processor circuitry is to match the biometric data identified by the biometric sensor to biometric data associated with the user in a database; and cause the second display screen to present the second version of the content in response to the match.

Example 15 includes at least one non-transitory computer readable storage medium comprising instructions that, when executed, cause processor circuitry to at least recognize an identifier indicative of sensitive information in content; filter the content to adjust a viewing property of the sensitive information in the content; cause a first display screen associated with a first device to present the filtered content; authenticate a user of a second device as an authorized user of the sensitive information; and in response to the authentication of the user, cause a second display screen associated with the second device to present the sensitive information.

Example 16 includes the at least one non-transitory computer readable storage medium of example 15, wherein the instructions cause the processor circuitry to cause the second display screen associated with the second device to present the sensitive information while the filtered content is presented by the first display screen associated with the first device.

Example 17 includes the at least one non-transitory computer readable storage medium of examples 15 or 16, wherein the instructions cause the processor circuitry to authenticate the user based on biometric data for the user.

Example 18 includes the at least one non-transitory computer readable storage medium of any of examples 15-17, wherein the instructions cause the processor circuitry to filter the content by generating an instruction to cause the first display screen associated with the first device to operate in a display mode in which the content is not viewable via the first display screen.

Example 19 includes the at least one non-transitory computer readable storage medium of any of examples 15-18, wherein the instructions cause the processor circuitry to filter the content by redacting or blurring the sensitive information.

Example 20 includes the at least one non-transitory computer readable storage medium of any of examples 15-19, wherein the instructions cause the processor circuitry to recognize the identifier in metadata of the content.

Example 21 includes the at least one non-transitory computer readable storage medium of any of examples 15-20, wherein the instructions cause the processor circuitry to cause the second display screen associated with the second device to present the content including the sensitive information as virtual reality content.

Example 22 includes the at least one non-transitory computer readable storage medium of any of examples 15-21, wherein the instructions cause the processor circuitry to cause the second display screen associated with the second device to present the sensitive information as augmented reality content.

Example 23 includes the at least one non-transitory computer readable storage medium of any of examples 15-22, wherein the instructions cause the processor circuitry to identify a user permission identifier assigned to the sensitive information; and authenticate the user based on the user permission identifier.

Example 24 includes an apparatus comprising means for detecting a sensitive information identifier in content; means for modifying the sensitive information in the content to generate filtered content, the modifying means to cause the filtered content to be presented via a first display screen associated with a first device; and means for managing a second display screen associated with a second device, the managing means to cause the second display screen associated with the second device to present the sensitive information when the filtered content is presented by the first display screen associated with the first device.

Example 25 includes the apparatus of example 24, further including means for authenticating a user of the second device prior to the managing means causing the second display screen associated with the second device to present the sensitive information.

Example 26 includes the apparatus of examples 24 or 25, wherein the authenticating means is to authenticate the user based on biometric data for the user.

Example 27 includes the apparatus of any of examples 24-26, wherein the authenticating means is to authenticate the user based on protected identification information received at one of the first device or the second device.

Example 28 includes the apparatus of any of examples 24-27, wherein the modifying means is to modify the sensitive information by at least one of applying a blur filter to the sensitive information or redacting the sensitive information in the content.

Example 29 includes the apparatus of any of examples 24-28, wherein the managing means is to cause the sensitive information to be presented as augmented reality content corresponding to the modified sensitive information in the filtered content.

Example 30 includes a method comprising recognizing, by executing an instruction with at least one processor, an identifier indicative of sensitive information in content; filtering, by executing an instruction with the at least one processor, the content to adjust a viewing property of the sensitive information in the content; causing, by executing an instruction with the at least one processor, a first display screen associated with a first compute device to present the filtered content; authenticating, by executing an instruction with the at least one processor, a user of a second compute device as an authorized user of the sensitive information; and in response to the authenticating of the user, causing, by executing an instruction with the at least one processor, a second display screen associated with the second compute device to present the sensitive information.

Example 31 includes the method of example 30, further including causing the second display screen associated with the second compute device to present the sensitive information while the filtered content is presented by the first display screen associated with the first compute device.

Example 32 includes the method of examples 30 or 31, further including authenticating the user based on biometric data for the user.

Example 33 includes the method of any of examples 30-32, further including filtering the content by generating an instruction to cause the first display screen associated with the first compute device to operate in a display mode in which the content is not viewable via the first display screen.

Example 34 includes the method of any of examples 30-33, further including filtering the content by redacting or blurring the sensitive information.

Example 35 includes the method of any of examples 30-34, further including recognizing the identifier in metadata of the content.

Example 36 includes the method of any of examples 30-35, further including causing the second display screen associated with the second compute device to present the content including the sensitive information as virtual reality content.

Example 37 includes the method of any of examples 30-36, further including causing the second display screen associated with the second compute device to present the sensitive information as augmented reality content.

Example 38 includes the method of any of examples 30-37, further including identifying a user permission identifier assigned to the sensitive information; and authenticating the user based on the user permission identifier.

Example 39 includes an apparatus comprising interface circuitry to access labeled content; and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations; the processor circuitry to perform at least one of the first operations, the second operations, or the third operations to instantiate content analysis circuitry to detect a sensitive information identifier associated with the labeled content, the sensitive information identifier to indicate the labeled content includes sensitive information; content modification circuitry to filter the labeled content to generate filtered labeled content, the filtered labeled content not including the sensitive information; and cause a first display screen associated with a first device to present the filtered content; and secondary display management circuitry to cause a second display screen associated with a second device to present the sensitive information during presentation of the filtered content by the first display screen associated with the first device.

Example 40 includes the apparatus of example 39, wherein the processor circuitry is to perform at least one of the first operations, the second operations, or the third operations to instantiate user authentication circuitry to authenticate a user of the second device, the secondary display management circuitry to cause the second display screen associated with the second device to present the sensitive information in response to successful authentication of the user.

Example 41 includes the apparatus of examples 39 or 40, wherein the processor circuitry is to perform at least one of the first operations, the second operations, or the third operations to instantiate the user authentication circuitry to identify a user permission identifier associated with the labeled content; retrieve reference biometric data based on the user permission identifier; and authenticate the user based on the reference biometric data and biometric data associated with the user.

Example 42 includes the apparatus of any of examples 39-41, wherein the processor circuitry is to perform at least one of the first operations, the second operations, or the third operations to instantiate the content modification circuitry to filter the labeled content by redacting one or more portions of the labeled content including the sensitive information.

Example 43 includes the apparatus of any of examples 39-42, wherein the processor circuitry is to perform at least one of the first operations, the second operations, or the third operations to instantiate the content modification circuitry to filter the labeled content by instructing display control circuitry of the first device to change a display mode of the display screen.

Example 44 includes the apparatus of any of examples 39-43, wherein the processor circuitry is to perform at least one of the first operations, the second operations, or the third operations to instantiate the secondary display management circuitry to cause the sensitive information to be presented by the second display screen associated with the second device as augmented reality content or virtual reality content.

Example 45 includes the apparatus of any of examples 39-44, wherein the processor circuitry is to perform at least one of the first operations, the second operations, or the third operations to instantiate the content analysis circuitry to detect the sensitive information identifier based on metadata of the labeled content.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry;
   instructions; and
   at least one programmable circuit to be programmed based on the instructions to:
      detect a sensitive information identifier associated with content, the sensitive information identifier to indicate the content includes sensitive information;
      filter the content to change a viewing property of the sensitive information;
      based on detection of the sensitive information identifier, cause a first display screen associated with a first device to enter a hidden display mode;
      cause a second display screen associated with a second device to present the sensitive information conditioned on successful biometric authentication of a user of the second device; and
      after a determination that the second device is not proximate to the user, cause the first display screen associated with the first device to exit the hidden display mode and present the filtered content.

2. The apparatus of claim 1, wherein one or more of the at least one programmable circuit is to:
   identify a user permission identifier associated with the content;
   retrieve reference biometric data based on the user permission identifier; and
   authenticate the user based on the reference biometric data and collected biometric data obtained with a biometric sensor.

3. The apparatus of claim 2, wherein the reference biometric data includes reference iris scan data, and the collected biometric data includes collected iris scan data obtained with an iris scanner.

4. The apparatus of claim 1, wherein one or more of the at least one programmable circuit is to filter the content by redacting one or more portions of the content including the sensitive information.

5. The apparatus of claim 1, wherein one or more of the at least one programmable circuit is to cause the sensitive information to be presented by the second display screen associated with the second device as augmented reality content or virtual reality content.

6. The apparatus of claim 1, wherein one or more of the at least one programmable circuit is to detect the sensitive information identifier based on metadata of the content.

7. The apparatus of claim 6, wherein the metadata is to indicate the sensitive information is at least one of confidential information or censored content.

8. A system comprising:
   a first compute device having a first display screen;
   a second compute device having a second display screen, the second display screen to provide a more restricted viewing area than the first display screen;
   instructions; and
   at least one programmable circuit to be programmed based on the instructions to:
      detect an identifier indicative of sensitive information in a portion of content;
      cause the sensitive information in the portion of the content to be modified to generate a first version of the content;
      based on detection of the identifier, cause the first display screen to enter a hidden display mode;
      cause the second display screen to present a second version of the content conditioned on successful biometric authentication of a user of the second compute device, the sensitive information unmodified in the second version of the content; and
      after a determination that the second device is not proximate to the user, cause the first display screen to exit the hidden display mode and present the first version of the content.

9. The system of claim 8, wherein the second compute device is head-mounted device.

10. The system of claim 8, wherein the portion is a first portion, and one or more of the at least one programmable circuit is to:
    determine that a second portion of the content is not associated with an identifier indicative of sensitive information; and
    cause the first version of the content to include the second portion of the content without modification.

11. The system of claim 8, wherein the second compute device includes a biometric sensor to collect biometric data of a user, and one or more of the at least one programmable circuit is to:
    match the collected biometric data to reference biometric data associated with the user in a database to determine whether biometric authentication is successful.

12. The system of claim 11, wherein the biometric sensor includes an iris scanner, the reference biometric data includes reference iris scan data, and the collected biometric data includes collected iris scan data obtained with the iris scanner.

13. The system of claim 8, wherein the identifier is to indicate the sensitive information is at least one of confidential information or censored content.

14. At least one non-transitory computer readable storage medium comprising instructions to cause at least one programmable circuit to at least:
- recognize an identifier indicative of sensitive information in content;
- filter the content to adjust a viewing property of the sensitive information in the content;
- based on detection of the sensitive information identifier, cause a first display screen associated with a first device to enter a hidden display mode;
- authenticate a user of a second device as an authorized user of the sensitive information based on biometric data;
- based on successful authentication of the user, cause a second display screen associated with the second device to present the content with the sensitive information; and
- after a determination that the second device is not proximate to the user, cause the first display screen associated with the first device to exit the hidden display mode and present the filtered content.

15. The at least one non-transitory computer readable storage medium of claim 14, wherein the instructions are to cause one or more of the at least one programmable circuit to authenticate the user based on iris scan data for the user.

16. The at least one non-transitory computer readable storage medium of claim 14, wherein the instructions are to cause one or more of the at least one programmable circuit to filter the content by redacting or blurring the sensitive information.

17. The at least one non-transitory computer readable storage medium of claim 14, wherein the instructions are to cause one or more of the at least one programmable circuit to cause the second display screen associated with the second device to present the content including the sensitive information as virtual reality content.

18. The at least one non-transitory computer readable storage medium of claim 14, wherein the instructions are to cause one or more of the at least one programmable circuit to cause the second display screen associated with the second device to present the sensitive information as augmented reality content.

19. The at least one non-transitory computer readable storage medium of claim 14, wherein the instructions are to cause one or more of the at least one programmable circuit to:
- identify a user permission identifier assigned to the sensitive information; and
- authenticate the user based on the user permission identifier.

20. The at least one non-transitory computer readable storage medium of claim 14, wherein the identifier is to indicate the sensitive information is at least one of confidential information or censored content.

* * * * *